R. H. & R. J. BROWN.
INK WELL COVER.
APPLICATION FILED MAR. 24, 1909.
943,733.
Patented Dec. 21, 1909.
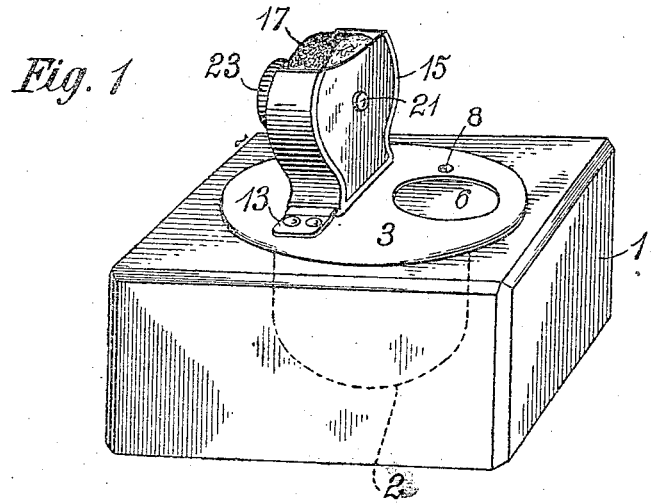
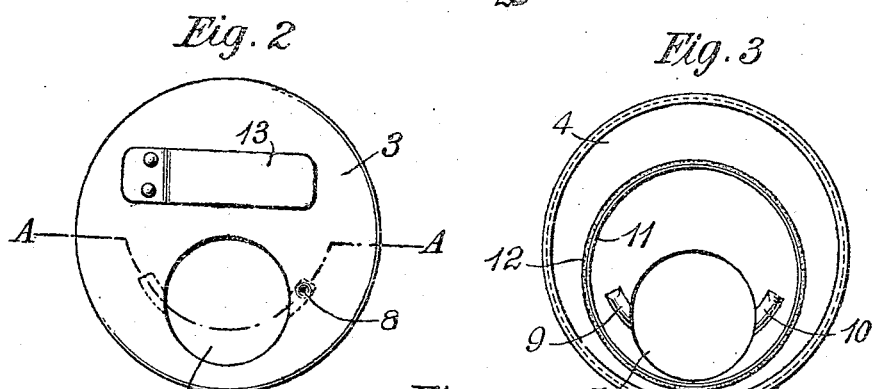
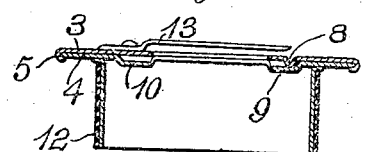
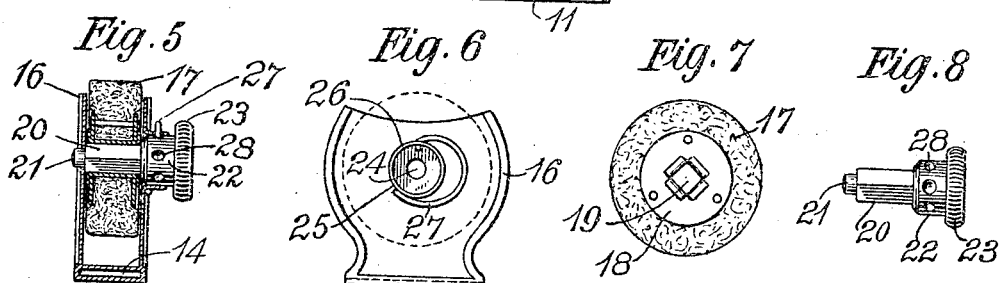
Witnesses:
Edw. W. Vaill Jr.
Wm. M. Earl
Inventors
R. H. Brown & R. J. Brown.
By their Attorneys

UNITED STATES PATENT OFFICE.

RICHARD H. BROWN, OF SHEEPSHEAD BAY, AND ROBERT J. BROWN, OF TOTTENVILLE, NEW YORK.

INK-WELL COVER.

943,733.  Specification of Letters Patent.  Patented Dec. 21, 1909.

Application filed March 24, 1909. Serial No. 485,365.

*To all whom it may concern:*

Be it known that we, RICHARD H. BROWN, residing at Sheepshead Bay, Long Island, New York, and ROBERT J. BROWN, residing at Tottenville, Staten Island, New York, have invented certain new and useful Improvements in Ink-Well Covers, of which the following is a full, clear, and exact disclosure.
Our invention relates to ink well covers which may be easily applied to different forms of ink wells now on the market and which will effectively enable the ink well to be closed, thereby producing an air-tight cover which has no loose parts to become displaced or lost.

A further object of our invention is to provide an ink well cover with a pen-wiping attachment which is located conveniently as concerns the top of the ink well, and one which will last for a considerable time, and when completely used may be thrown away and the absorbent portion thereof replaced.
For a detailed description of one form of our invention which we at present deem preferable, reference may be had to the following specification and to the accompanying drawing forming a part thereof, in which—

Figure 1 is a perspective view of an ink well having our improved cover and pen-wiping attachment applied thereto; Fig. 2 is a plan-view of the ink well cover showing the pen-wiping attachment removed; Fig. 3 is a plan-view of the bottom of the ink well cover; Fig. 4 is a transverse sectional view taken substantially on the line A A Fig. 2; Fig. 5 is a vertical sectional view of the pen-wiping attachment; Fig. 6 is a side elevation thereof, showing the shaft and wiping wheel removed; Fig. 7 is an elevation of said wheel, and Fig. 8 is a side view of the shaft upon which the wiping wheel is mounted.

Referring to the drawings, the numeral 1 indicates an ink well of any preferred shape or design and composed of any suitable material, such as glass, porcelain, metal, rubber, etc.; the numeral 2 indicates the recess forming the well proper; the numeral 3 indicates the top plate of the cover, and 4 the bottom thereof. These are preferably attached together, so as to be rotatable, by forming a downwardly curved flange 5 on the edge of the top plate 3, which engages the circumference of the bottom plate 4. The top and bottom plates are provided respectively with openings 6 and 7 adapted to register with each other when the two plates are in the proper position and the ink well is in use. The top plate 3 is provided with a projection 8 adapted to engage arc shaped depressions or grooves 9 and 10 which limit the movement of the top plate in relation to the bottom plate when it is desired to open or close the cover. A circular flange 11 is attached to the bottom plate 4 and is covered with a suitable elastic material, such as rubber, indicated at 12. This flange is adapted to be inserted into the ink well to hold the cover in position thereon, and the thickness of the rubber may be varied in order to cause the cover to fit ink wells which vary slightly in diameter. It should be noted that the flange 11 is eccentrically located on the bottom plate 4, and by this arrangement we are enabled to provide an opening through both plates which is greater than one-half the diameter of said flange 11. The openings 6 and 7 may therefore be made somewhat larger than the radius of the cylindrical flange 11.

A flexible leaf or tongue 13 is attached to the top plate 3 in a suitable manner, and is adapted to pass through the slot 14 in the base of the pen-wiping attachment 15. This attachment preferably consists of a casing 16 made in the shape shown, and is adapted to receive a wheel of any suitable fibrous or porous material 17, which, when in place within the casing, leaves its upper portion exposed so that a pen may be drawn across the same. The wheel 17 is provided with a suitable hub 18 having a square or angular hole 19 therein, which receives the square shaft 20. This shaft 20 is provided at one end with a small cylindrical stud or bearing 21, and its opposite end with a larger bearing 22, which terminates in a milled head 23. The casing 16 is provided on one side with a hole 24 adapted to receive the stud 21, and on its opposite side with a flange 25 adapted to receive the bearing 22. The flange 25 has a hole 26 through which projects one end of a spring 27, which is attached at its opposite end to the casing. The free end of the spring 27 is adapted to enter recesses 28 in the bearing 29, and thereby retain the wheel in position within the casing as concerns its circumferential rotation, and also prevents the said shaft from accidentally becoming disengaged from the wheel. The wiping wheel 17 being detachable and being made of inexpensive material, may be manufactured at a small cost and may be substituted whenever one of such wheels is worn out or becomes unduly saturated with ink. The fact that the end of the spring 27 enters the recesses 28 in the bearing 22 enables the wheel 17 to be turned to bring new portions of the surface thereof above the top of the casing when one portion becomes sufficiently saturated to prevent its further use. Thus the whole circumference of the wheel may be used. When the spring is not engaging one of said recesses and rests upon a portion of the bearing between the same, the shaft may be easily withdrawn to allow the removal of the wheel. The casing 16 being mounted upon the upper plate 3, said casing serves as a handle by means of which the upper plate may be turned or rotated, thereby opening or closing the cover.

Having thus described this embodiment of our invention, we do not wish to be understood as being limited to the exact details and formal arrangements of parts herein set forth, for various changes may be made without departing from the spirit and scope of our invention.

What we claim and desire to protect by Letters Patent is:

1. An ink well cover comprising a rotatable plate having an opening near one side, a tongue attached thereto near the other side, a casing having an opening adapted to receive said tongue, and fibrous material carried by said casing and constituting a pen wiper.

2. An ink-well cover comprising a lower plate having a pen opening near one edge and a circular retaining flange on its lower face and near the same edge, an upper plate mounted and adapted to rotate on the lower plate and having near one edge an opening adapted to register with said pen opening, and near the other edge a pen-wiper, substantially as described.

3. In combination with an ink well cover, a casing carried thereby, a wheel of fibrous material located within said casing, a shaft passing through said casing and wheel for rotating the latter, a bearing on the end of said shaft, having recesses therein, and a spring carried by said casing, having one end adapted to engage said recesses, for holding said shaft and wheel in position within said casing.

Dated, the 15th day of March, 1909.

RICHARD H. BROWN.
ROBERT J. BROWN.

Witnesses:
EDWARD W. VAILL, Jr.,
JAMES J. COSGROVE.